US011170018B2

(12) United States Patent
Gao et al.

(10) Patent No.: US 11,170,018 B2
(45) Date of Patent: Nov. 9, 2021

(54) IDENTIFYING AN APPROPRIATE CONTACT ACROSS COLLABORATIVE APPLICATIONS

(71) Applicant: International Business Machines Corporation, Armonk, NY (US)

(72) Inventors: Lei Gao, Xi'an (CN); Xiao Ming Ma, Xi'an (CN); Wu Yan, Beijing (CN); Xu Qin Zhao, Beijing (CN); Shuang Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/551,313

(22) Filed: Aug. 26, 2019

(65) Prior Publication Data
US 2021/0064607 A1 Mar. 4, 2021

(51) Int. Cl.
| | | |
|---|---|---|
| *G06F 16/248* | (2019.01) | |
| *G06F 16/2457* | (2019.01) | |
| *G06F 16/2458* | (2019.01) | |

(52) U.S. Cl.
CPC ........ *G06F 16/248* (2019.01); *G06F 16/2471* (2019.01); *G06F 16/24578* (2019.01)

(58) Field of Classification Search
CPC ............... G06F 16/248; G06F 16/2471; G06F 16/24578
See application file for complete search history.

(56) References Cited

U.S. PATENT DOCUMENTS

| | | | |
|---|---|---|---|
| 9,288,243 B2 | 3/2016 | Banatwala et al. | |
| 9,558,473 B2 | 1/2017 | Moore et al. | |
| 2011/0125661 A1 | 5/2011 | Hull et al. | |
| 2013/0014021 A1* | 1/2013 | Bau | G06Q 10/107 715/739 |
| 2014/0108442 A1* | 4/2014 | Paglia | G06F 16/9535 707/758 |
| 2015/0379131 A1* | 12/2015 | Gurevich | G06F 16/24578 707/723 |

(Continued)

FOREIGN PATENT DOCUMENTS

CN 102307242 A 1/2012

*Primary Examiner* — Jay A Morrison
(74) *Attorney, Agent, or Firm* — Robert A. Voigt, Jr.; Winstead PC

(57) ABSTRACT

A computer-implemented method, system and computer program product for identifying an appropriate contact across collaborative applications. Contact information is collected from monitored messages, communication lists and contact lists in each collaborative application. Contact records are generated based on the collected contact information, where such records are inserted into a contact list. After receiving a query from a user containing a keyword(s) that include a nickname (or portion thereof) of a second user whom the user desires to interact via the current collaborative application, a search is performed in the contact list for any record containing a nickname that is similar to the provided keyword(s). Record(s) in the contact list containing a nickname that exceeds a threshold degree of similarity as the keyword(s) are identified. Such identified records may contain a user identifier which is used to identify the appropriate nickname of the second user associated with the current collaborative application.

20 Claims, 8 Drawing Sheets

(56) References Cited

U.S. PATENT DOCUMENTS

2016/0085785 A1* 3/2016 Hoffmann ........... G06F 3/04842
                                                707/754
2016/0210363 A1* 7/2016 Rambhia ............... G06F 3/0482
2017/0083962 A1* 3/2017 Agarwal ................ G06Q 50/01
2020/0050663 A1* 2/2020 Park ...................... G06F 40/295

* cited by examiner

| | UID | Nickname | Source | Time | Frequency | Score | RELATED BY |
|---|---|---|---|---|---|---|---|
| 501A | wyun@xxx.com | Lisa | Notes® | 2019-1-20 | 8 | 80 | DIRECT: E-MAIL COMMUNICATION |
| | wyun@xxx.com | yun wang | ST® | 2019-2-20 | 7 | 90 | DIRECT: DIRECT TALK |
| | wyun@xxx.com | ywang | slack® | 2019-2-15 | 8 | 100 | DIRECT: DIRECT TALK |
| 501N | lshang@xxx.com | lish | slack® | 2019-2-24 | 3 | 50 | INDIRECT: MENTIONED IN THE TALK WITH GLCDL |
| | ...... | ...... | ...... | ...... | ...... | ...... | ...... |

FIG. 5

IDENTIFYING AN APPROPRIATE CONTACT ACROSS COLLABORATIVE APPLICATIONS

TECHNICAL FIELD

The present invention relates generally to collaborative systems, and more particularly to identifying an appropriate contact across collaborative applications.

BACKGROUND

Collaborative systems utilize collaborative applications to enable users to communicate with one another, such as in an organization. A collaborative application is an application used by multiple users within the organization to interact with one another, such as via instant messaging, e-mailing, file sharing, web conferencing, calendar synchronization, etc. Examples of such collaborative applications include Sometime®, Slack® and Box.

In an organization, there are times when a user desires to collaborate with other users across different collaborative applications. In such scenarios, the user needs to locate the appropriate contact in order to communicate with the appropriate user via the collaborative application. For example, a user may chat with someone via Sometime® and then desire to share some files with the same individual via Box.

Users may attempt to access collaborative applications as well as connect with other users using user identifiers (UIDs). However, UIDs often include complex letter combinations which are not memorable to users. As a result, users may prefer to use the person's name to locate contacts. However, there may be several individuals in the organization with the same name.

As a result, users may use a nickname to locate the contact where a nickname is a synonym for the screen name of the user.

However, each collaborative application may be associated with a different nickname. That is, a user may have a different nickname for different collaborative applications. For example, one collaborative application (e.g., Slack®) may be associated with the user's initials; whereas, in another collaborative application (e.g., Notes®, Box), it may be associated with the user's first name. Hence, in order for a user to communicate with the same individual using different collaborative applications, the user may need to provide different nicknames. Such contact information though may not be readily available since collaborative applications do not currently share contact information across collaborative applications.

SUMMARY

In one embodiment of the present invention, a computer-implemented method for identifying an appropriate contact across collaborative applications comprises monitoring messages, communication lists and contact lists in each collaborative application in an organization. The method further comprises collecting contact information from the monitored messages, communication lists and contact lists. The method additionally comprises generating a contact list comprising contact records based on the collected contact information. Furthermore, the method comprises receiving one or more keywords from a user of a current collaborative application, where the one or more keywords comprise a nickname or a portion of the nickname. Additionally, the method comprises searching the contact list using the received one or more keywords. In addition, the method comprises identifying one or more contact records in the contact list containing a nickname that exceeds a threshold degree of similarity as the one or more keywords. The method further comprises generating a first search result based on the identified one or more contact records, where the first search result contains the searched one or more keywords and a user identifier. The method additionally comprises searching and identifying a corresponding nickname associated with the current collaborative application being used by the user, where the corresponding nickname is identified using the user identifier identified in the first search result. Furthermore, the method comprises appending the identified nickname to the first search result forming an appended search result. Additionally, the method comprises searching for contact information on a server of the current collaborative application using the one or more keywords forming a second search result. In addition, the method comprises merging the appended search result with the second search result. The method further comprises presenting the merged search results to the user.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 5 illustrates an exemplary contact list in accordance with an embodiment of the present invention;

DETAILED DESCRIPTION

The present invention comprises a computer-implemented method, system and computer program product for identifying an appropriate contact across collaborative applications. In one embodiment of the present invention, contact information is collected from monitored messages, communication lists and contact lists in each collaborative application. Contact records are generated based on the collected contact information, where such records are inserted into a contact list. After receiving a query from a user containing a keyword(s) that include a nickname or a portion of a nickname of a second user whom the user desires to interact via the current collaborative application, a search is performed in the contact list for any record containing a nickname that is similar to the provided keyword(s). Record(s) in the contact list containing a nickname that exceeds a threshold degree of similarity as the keyword(s) are identified and sorted. A first search result is then generated based on the identified contact record(s). User identifiers that were identified in the first search result may then be used to identify a corresponding nickname in the current collaborative application (the collaborative application that is currently being used by the user) that is associated with the second user (whom the user desires to interact via the current collaborative application). Such a nickname may then be appended to the first search result. The user will now be able to identify the appropriate contact for the user to use in order to communicate with the appropriate person using the currently used collaborative application. A further search for contact information is then performed on the server (e.g., address server) of the current collaborative application using the keyword(s) forming a second search result. The appended first search result is combined with the second search result, which is then presented to the user. In this manner, collaborative systems are improved to enable the user to locate contact information across different collaborative applications.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
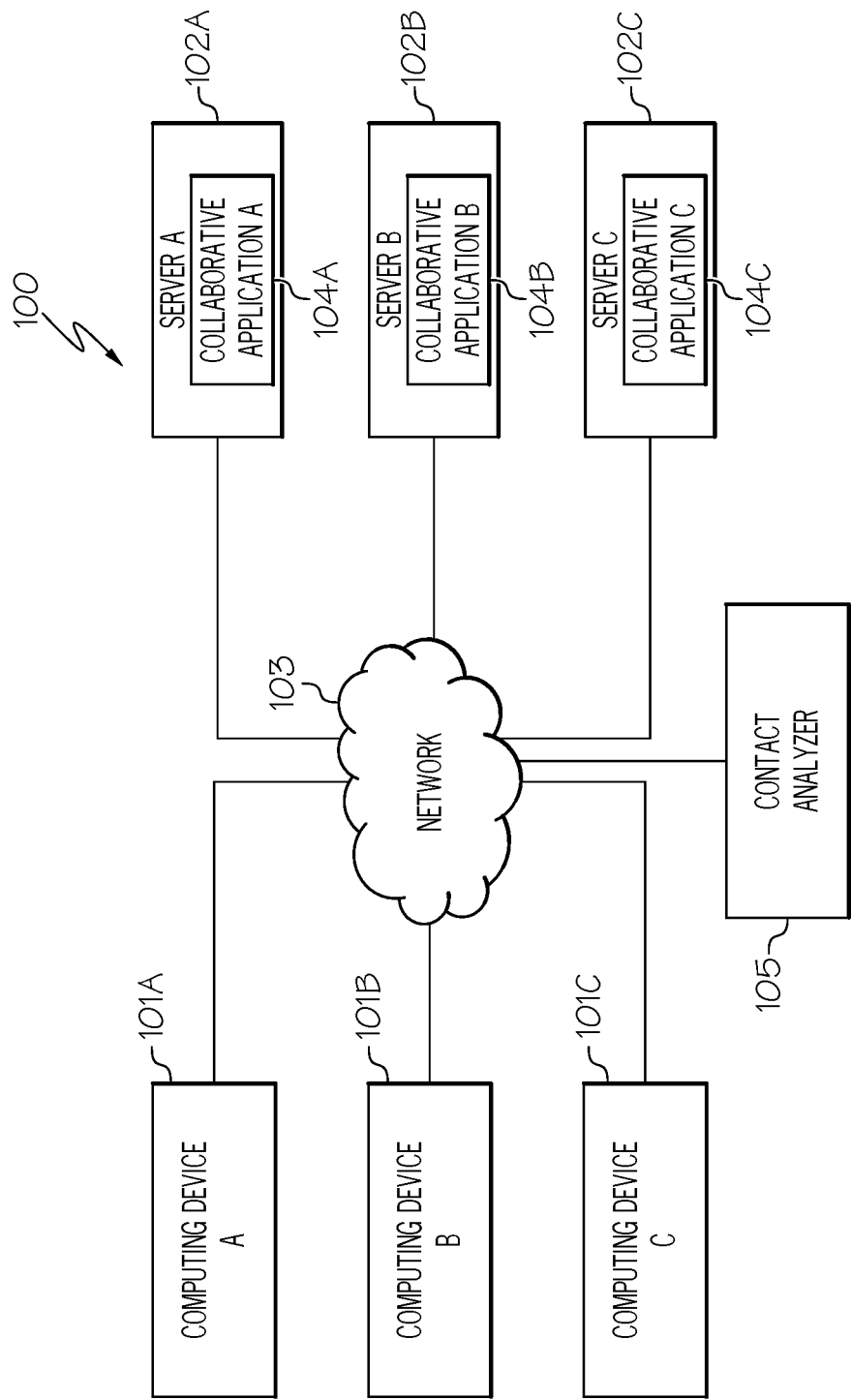
FIG. 1 illustrates a communication system for practicing the principles of the present invention in accordance with an embodiment of the present invention.

Referring now to the Figures in detail, FIG. 1 illustrates a communication system 100 of an organization for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to servers 102A-102C (identified as "Server A," "Server B," and "Server C," respectively, in FIG. 1) via a network 103. Computing devices 101A-101C may collectively or individually be referred to as computing devices 101 or computing device 101, respectively. Servers 102A-102C may collectively or individually be referred to as servers 102 or server 102, respectively. The user of computing device 101 may also be referenced herein as user 101.

Furthermore, as shown in FIG. 1, servers 102A-102C may each be configured to host a collaborative application 104A-104C, respectively. Collaborative applications 104A-104C (identified as "Collaborative Application A," "Collaborative Application B," and "Collaborative Application C," respectively, in FIG. 1) may collectively or individually be referred to as collaborative applications 104 or collaborative application 104, respectively. A "collaborative application" 104, as used herein, refers to an application used by multiple users of computing devices 101 within an organization to interact with one another, such as via instant messaging, e-mailing, file sharing, web conferencing, calendar synchronization, etc. Examples of such collaborative applications include Sometime®, Slack® and Box. Each server 102 may host the same or a different collaborative application 104 than another server 102.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101 and servers 102.

Computing devices 101 are configured to access collaborative applications 104 that are hosted by servers 102 which allows users of computing devices 101 to interact with other users of computing devices 101, such as via instant messaging, e-mailing, file sharing, web conferencing, calendar synchronization, etc. In connection with utilizing collaborative applications 104, each computing device 101 is configured to send and receive text-based messages during an instant messaging session. Any user of computing device 101 may be the creator or initiator of an instant message (message in instant messaging) and any user of computing device 101 may be a recipient of an instant message. Furthermore, any user of computing device 101 may be able to create, receive and send e-mails. Additionally, any user of computing device 101 may be able to send and receive text messages, such as Short Message Services (SMS) messages. Furthermore, any user of computing device 101 may be able to create, receive and send other types of messages, such as social media posts. The term "messages," as used herein, encompasses each of these types of messages.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a contact analyzer 105 connected to network 103 via wire or wirelessly. As discussed further below, contact analyzer 105 is configured to identify an appropriate contact across collaborative applications by collecting contact information from the monitored messages, communication lists and contact lists in each collaborative application 104. Contact records are generated based on the collected contact information, where such records are inserted into a contact list. Such a contact list may be used to assist the user in identifying the appropriate contact in response to the user providing a nickname or a portion of a nickname as discussed further below in connection with FIGS. 3-9. A description of the hardware configuration of contact analyzer 105 is provided below in connection with FIG. 2.

System 100 is not to be limited in scope to any one particular network architecture. System 100 may include any number of computing devices 101, servers 102, networks and contact analyzers 105. Furthermore, while FIG. 1 illustrates contact analyzer 105 as being a separate physical device, some or all of the functionality of contact analyzer 105 may reside in computing device 101.

Figure 2:
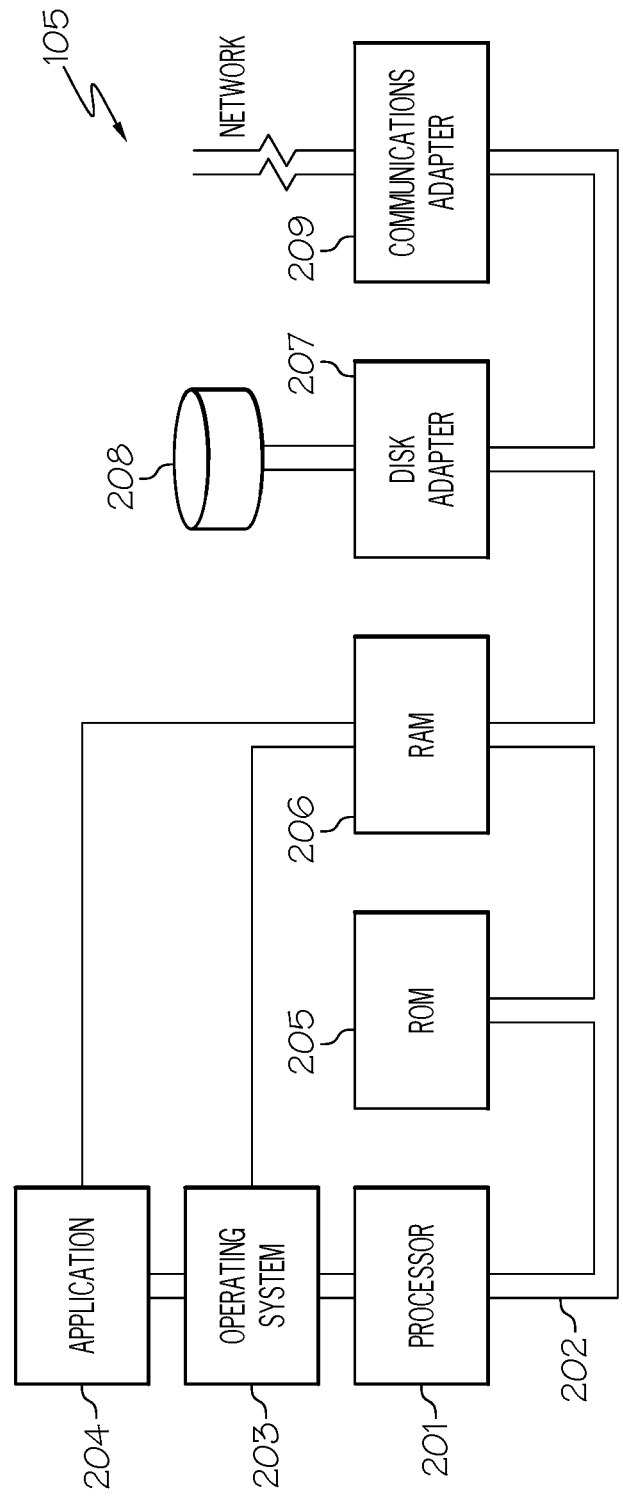
FIG. 2 illustrates an embodiment of the present invention of a hardware configuration of the contact analyzer which is representative of a hardware environment for practicing the present invention.

Referring now to FIG. 2, FIG. 2 illustrates a hardware configuration of contact analyzer 105 (FIG. 1) which is representative of a hardware environment for practicing the present invention. Referring to FIG. 2, contact analyzer 105 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for identifying an appropriate contact across collaborative applications as discussed below in association with FIGS. 3-9.

Referring again to FIG. 2, read-only memory ("ROM") 205 is connected to system bus 202 and includes a basic input/output system ("BIOS") that controls certain basic functions of contact analyzer 105. Random access memory ("RAM") 206 and disk adapter 207 are also connected to system bus 202. It should be noted that software components including operating system 203 and application 204 may be loaded into RAM 206, which may be contact analyzer's 105 main memory for execution. Disk adapter 207 may be an integrated drive electronics ("IDE") adapter that communicates with a disk unit 208, e.g., disk drive. It is noted that the program for identifying an appropriate contact across collaborative applications, as discussed below in association with FIGS. 3-9, may reside in disk unit 208 or in application 204.

Contact analyzer 105 may further include a communications adapter 209 connected to bus 202. Communications adapter 209 interconnects bus 202 with an outside network (e.g., network 103 of FIG. 1) thereby allowing contact analyzer 105 to communicate with computing devices 101 and servers 102.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, collaborative systems utilize collaborative applications to enable users to communicate with one another, such as in an organization. A collaborative application is an application used by multiple users within the organization to interact with one another, such as via instant messaging, e-mailing, file sharing, web conferencing, calendar synchronization, etc. Examples of such collaborative applications include Sometime®, Slack® and Box. In an organization, there are times when a user desires to collaborate with other users across different collaborative applications. In such scenarios, the user needs to locate the appropriate contact in order to communicate with the appropriate user via the collaborative application. For example, a user may chat with someone via Sometime® and then desire to share some files with the same individual via Box. Users may attempt to access collaborative applications as well as connect with other users using user identifiers (UIDs). However, UIDs often include complex letter combinations which are not memorable to users. As a result, users may prefer to use the person's name to locate contacts. However, there may be several individuals in the organization with the same name. As a result, users may use a nickname to locate the contact where a nickname is a synonym for the screen name of the user. However, each collaborative application may be associated with a different nickname. That is, a user may have a different nickname for different collaborative applications. For example, one collaborative application (e.g., Slack®) may be associated with the user's initials; whereas, in another collaborative application (e.g., Notes®, Box), it may be associated with the user's first name. Hence, in order for a user to communicate with the same individual using different collaborative applications, the user may need to provide different nicknames. Such contact information though may not be readily available since collaborative applications do not currently share contact information across collaborative applications. Consequently, collaborative systems are deficient in terms of enabling the user to locate contact information across different collaborative applications.

Figure 3:
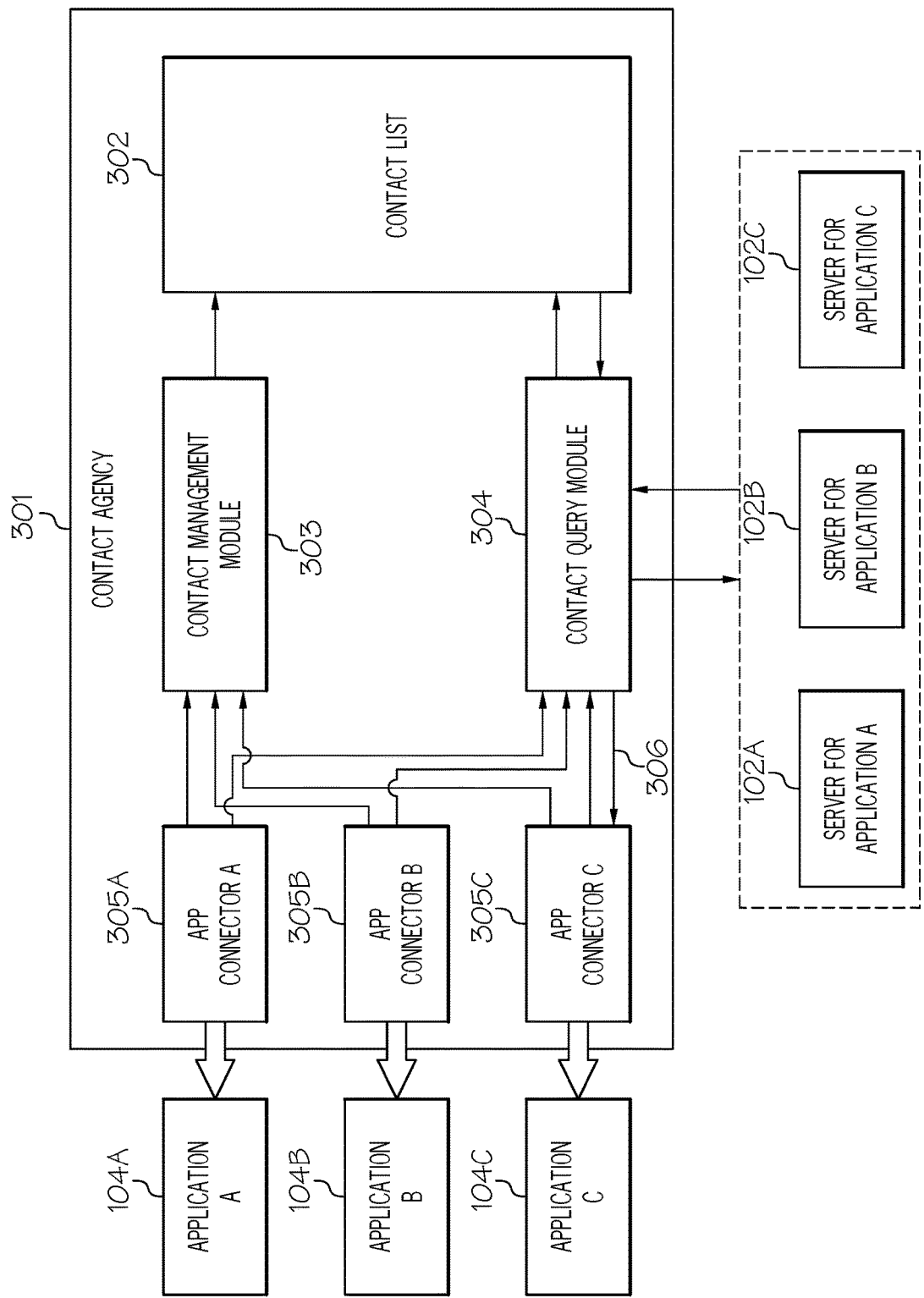
FIG. 3 is a diagram of the software components of the contact analyzer used to collect contact information from monitored messages, communication lists and contact lists across different collaborative applications in an organization in accordance with an embodiment of the present invention.
Figure 4:
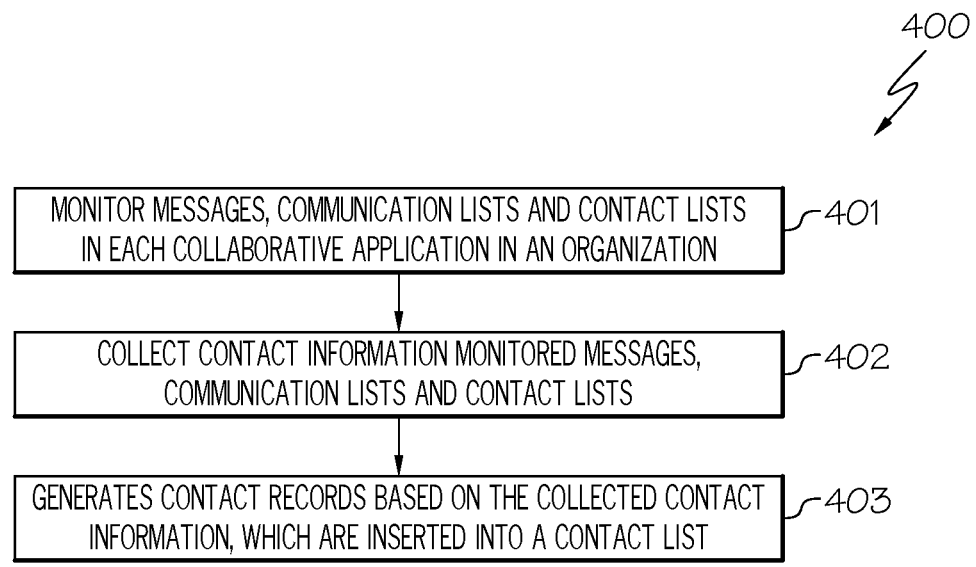
FIG. 4 is a flowchart of a method for creating a contact list in accordance with an embodiment of the present invention.
Figure 6:
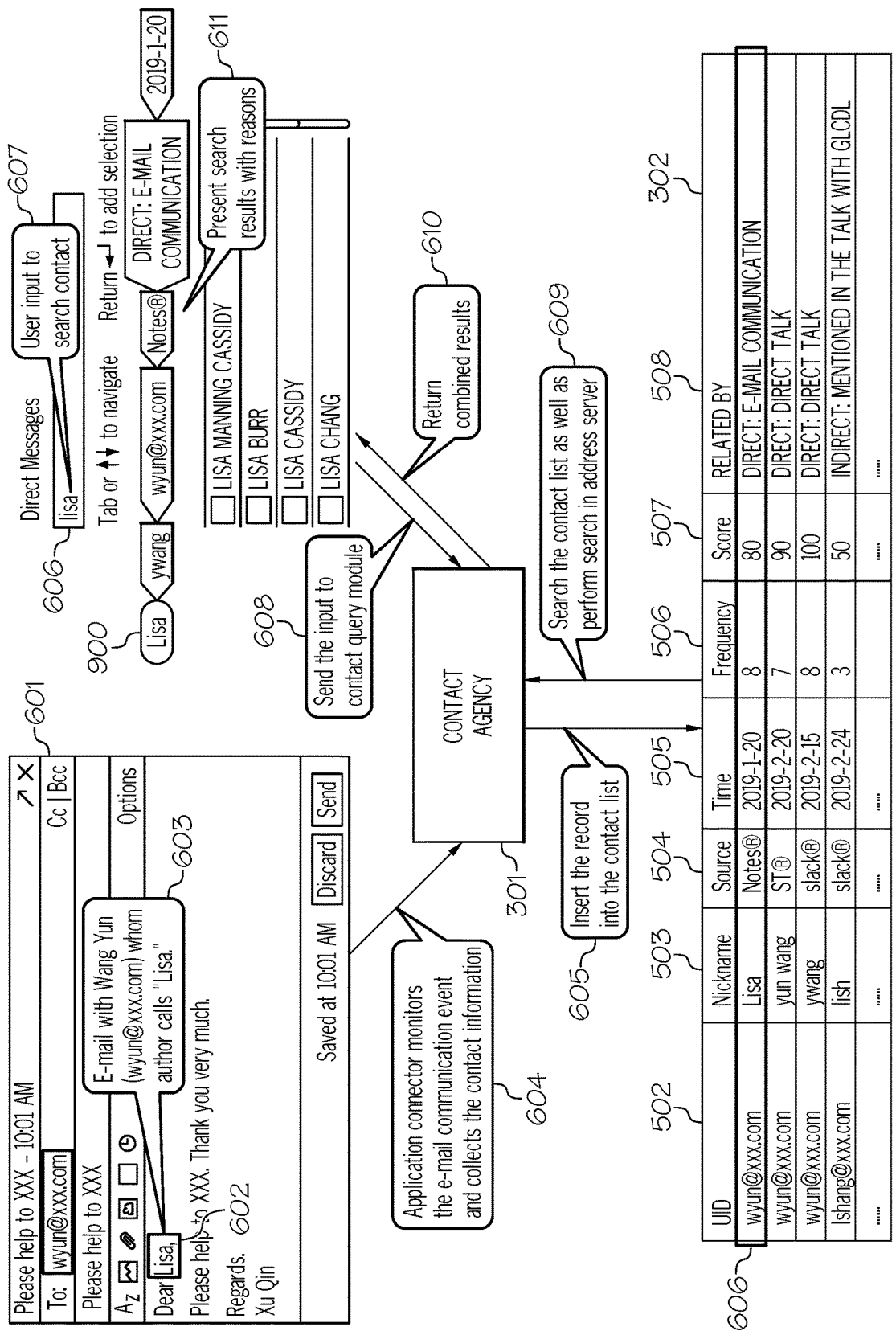
FIG. 6 is an illustration of the contact analyzer collecting contact information from monitored messages, communication lists and contact lists, which is used to generate contact records in a contact list, as well as providing search results from a query, in accordance with an embodiment of the present invention.
Figure 7:
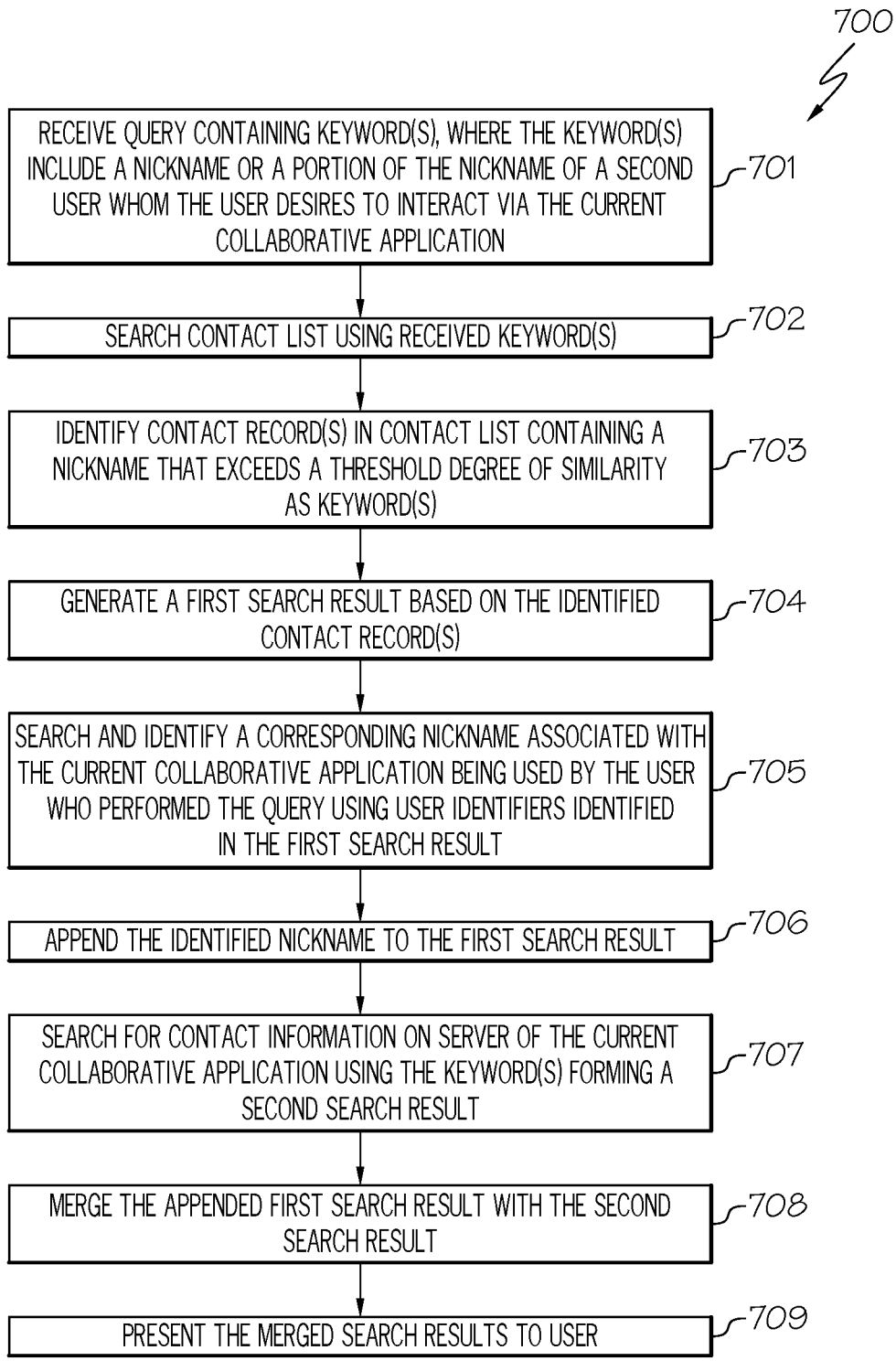
FIG. 7 is a flowchart of a method for identifying an appropriate contact across different collaborative applications in accordance with an embodiment of the present invention.
Figure 8:
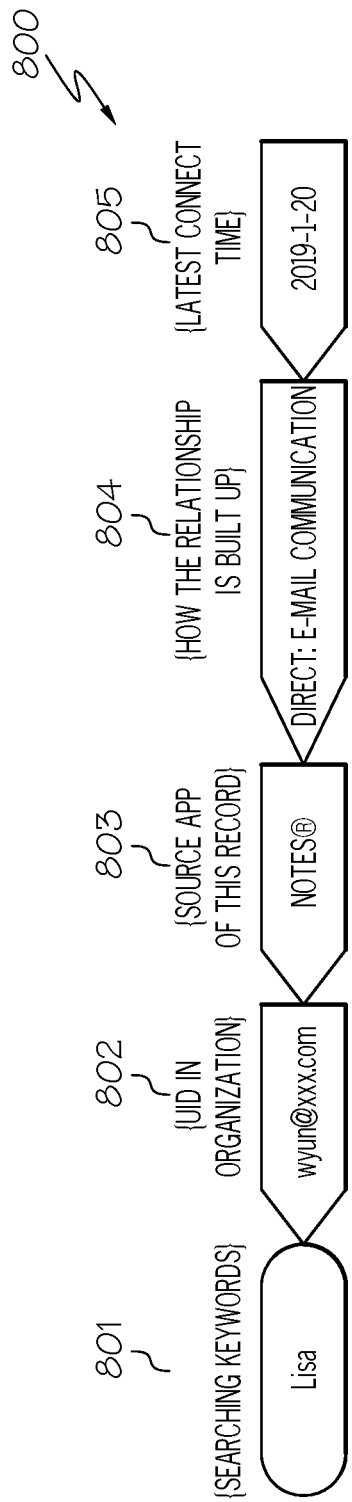
FIG. 8 illustrates a single search result record generated by the contact query module in accordance with an embodiment of the present invention.
Figure 9:
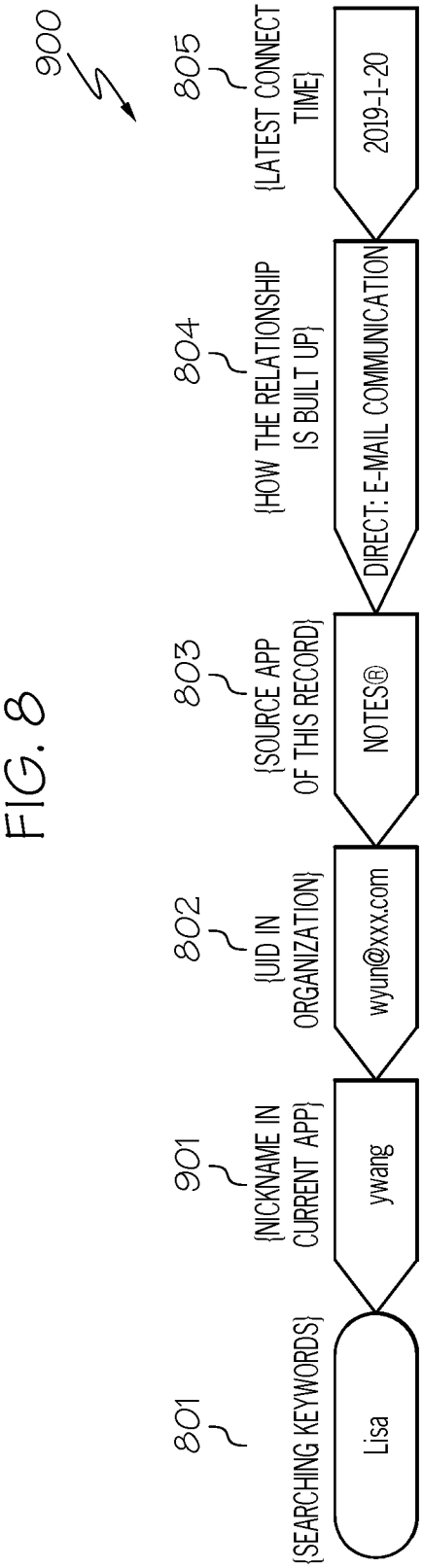
FIG. 9 illustrates appending the nickname of the second user to the search result record of FIG. 8 whom the user desires to interact via the current collaborative application in accordance with an embodiment of the present invention.

The embodiments of the present invention provide a means for improving collaborative systems by enabling the user to locate contact information across different collaborative applications as discussed below in connection with FIGS. 3-9. FIG. 3 is a diagram of the software components of the contact analyzer used to collect contact information from monitored messages, communication lists and contact lists across different collaborative applications in an organization. FIG. 4 is a flowchart of a method for creating a contact list. FIG. 5 illustrates an exemplary contact list. FIG. 6 is an illustration of the contact analyzer collecting contact information from monitored messages, communication lists and contact lists, which is used to generate contact records in a contact list, as well as providing search results from a query. FIG. 7 is a flowchart of a method for identifying an appropriate contact across different collaborative applications. FIG. 8 illustrates a single search result record generated by the contact query module. FIG. 9 illustrates appending the nickname of the second user to the search result record of FIG. 8 whom the user desires to interact via the current collaborative application.

As stated above, FIG. 3 is a diagram of the software components of contact analyzer 105 used to collect contact information from monitored messages, communication lists and contact lists across different collaborative applications in an organization in accordance with an embodiment of the present invention. In one embodiment, these software components may reside in application 204 (FIG. 2) of contact analyzer 105.

The following provides a brief description of these software components. A more detailed description of these software components (including their functionalities) is provided below in conjunction with FIGS. 4-9.

Referring to FIG. 3, in conjunction with FIGS. 1-2, contact analyzer 105 includes a module referred to herein as the "contact agency" 301 configured to generate and store a contact list 302 containing contact records, which is discussed further below.

Contact agency 301 includes a contact management module 303 and a contact query module 304. Contact management module 303 is configured to select, insert and update the contact list; whereas, contact query module 304 is configured to coordinate the query when the user of computing device 101 inputs the keywords (e.g., nickname) to search for contacts.

Furthermore, as shown in FIG. 3, contact agency 301 includes the modules of application connector A 305A ("App Connector A"), application connector B 305B ("App Connector B") and application connector C 305C ("App Connector C"), which are connected to contact management module 303 to provide the collected contact information. Application connectors 305A-305C may collectively or individually be referred to as application connectors 305 or application connector 305, respectively. In one embodiment, application connector 305 is configured to analyze the communication content that transpires when users are interacting via a collaborative application 104 (e.g., messages transmitted and received among the users of computing devices 101 when utilizing collaborative applications 104) using natural language processing and collect such information, such as the UID, nickname of the user, contact frequency (frequency in which the nickname is used), etc. For example, application connectors 305A-305C analyze the communication content that transpires when users are interacting via collaborative applications 104A-104C, respectively.

Additionally, each application connector 305 is configured to receive a query issued by a user of computing device 101 utilizing collaborative application 104 for the contact information of a second user whom the user desires to interact with. For example, a user of computing device 101 may be utilizing collaborative application A 104A and desires to communicate with a second user via collaborative application A 104A. In one embodiment, such a query includes keyword(s), where the keyword(s) include a nickname or a portion of a nickname (e.g., nickname of the second user), where a nickname is a synonym for the screen name of a user. In such situations, application connector 305 passes along the query to contact query module 304.

Upon receiving the query, contact query module 304 searches contact list 302 for contact record(s) containing a nickname that exceed a threshold degree of similarity as the keyword(s).

Furthermore, contact query module 304 identifies the corresponding nickname associated with the user identifier identified from the search of contact list 302 as well as associated with collaborative application 104 currently being used by the user who performed the query. Such a nickname is appended to the search result of the search of contact list 302.

Additionally, in on embodiment, contact query module 304 searches for contact information on one of the servers 102A-102C (e.g., address servers) of the corresponding collaborative applications 104A-104C, respectively, that hosts the current collaborative application 104 being used by the user who performed the query. In one embodiment, server 102 is configured to store contact information for users of computing devices 101 that utilize the hosted collaborative application 104, including user identifiers.

In one embodiment, such a search result (result of searching for contact information on server 102 hosting the current collaborative application 104 being used by the user) is merged with the prior search result (result of searching contact list 302 with the appended nickname), which is then presented to the user (user who performed the search query), such as the user of collaborative application 104C as shown in FIG. 3 (see arrow 306).

Using these software components, contact analyzer 105 creates a contact list 302 storing contact records containing nicknames used by users across different collaborative applications 104 as discussed below in connection with FIG. 4.

FIG. 4 is a flowchart of a method for creating a contact list 302 (FIG. 3) in accordance with an embodiment of the present invention.

Referring to FIG. 4, in conjunction with FIGS. 1-3, in step 401, application connectors 305 of contact analyzer 105 monitor messages, communication lists and contact lists in each collaborative application 104 in an organization. In one embodiment, such monitoring may involve capturing network traffic via port mirroring or a network tap. In another embodiment, such monitoring may involve monitoring social media posts.

In step 402, application connectors 305 of contact analyzer 105 collect contact information from the monitored messages, communication lists and contact lists.

In one embodiment, information is collected from the monitored messages, communication lists and contacts by utilizing natural language processing. For example, application connectors 305 may utilize natural language processing to identify communication/contact lists, such as the users listed after the terms of "From:," "To:" and "CC:" in an e-mail message created in collaborative application 104. In one embedment, such contacts are identified based on identifying terms in an e-mail message, such as "From," "To," or "CC."

In another embodiment, application connectors 305 utilize natural language processing to identify communication/contact lists created in collaborative application 104, such as a social media application.

In another embodiment, application connectors 305 utilize natural language processing to identify names (e.g., John) mentioned in a message (e.g., e-mail message, social media post) received/transmitted using collaborative application 104. For example, application connectors 305 may identify names based on matching terms from a list of commonly used names. In another example, application connectors 305 use complex pattern-based extraction or statistical extraction to identify names mentioned in a message.

In another embodiment, application connectors 305 utilize natural language processing to identify communication/contact lists used by collaborative application 104 to share files in a cloud storage system. Such lists may be identified based on the action of file sharing and then identifying the users who received/transmitted such files.

In step 403, contact management module 303 generates contact records based on the collected contact information, which are inserted into a contact list 302. An example of a contact list 302 containing contact records is shown in FIG. 5.

Referring to FIG. 5, FIG. 5 illustrates an exemplary contact list 302 (FIG. 3) in accordance with an embodiment of the present invention.

As shown in FIG. 5, contact list 302 includes records 501A-501N, where N is a positive integer number, where each record includes information, such as the user identifier (UID) 502, a nickname 503, a source 504, a time 505, a frequency 506, a score 507 and relationship information ("related by") 508.

A UID 502, as used herein, refers to the unique user identification of the contact in the organization. A nickname 503, as used herein, refers to the contact nickname used in the collaborative application 104. Source 504, as used herein, refers to the name of the source collaborative application 104 upon which the record was created. Time 505, as used herein, refers to the latest connection time. Frequency 506, as used herein, refers to the connection frequency with the nickname. That is, frequency 506 refers to the number of times the nickname was discussed/mentioned in connection with the source collaborative application 104 over a period of time, which may be user-specified. Score 507 refers to a number that indicates the degree in which the user is connected to the nickname. In one embodiment, the higher the score, the greater the degree in which the user is connected to the nickname, and vice-versa. "Related by" 508, as used herein, refers to how such information in the record 501 was obtained, such as directly or indirectly from a message. For example, if the information was obtained from the sender or recipient, then such information would be deemed to be obtained directly. However, if the sender or recipient discusses another user using a nickname, then such information would be said to be obtained indirectly.

In one embodiment, score 507 is computed based on frequency 506, the latest connection time 505 and relationship information 508. In one embodiment, the higher the connection frequency, the greater the score and vice-versa. In one embodiment, the closer the latest connection time is to the current time, the greater the score and vice-versa. In one embodiment, information obtained directly is attributed to a higher score; whereas, information obtained indirectly is attributed to a lower score.

Referring now to FIG. 6, FIG. 6 is an illustration of contact analyzer 105 collecting contact information from monitored messages, communication lists and contact lists, which is used to generate contact records in a contact list 302, as well as providing search results from a query, in accordance with an embodiment of the present invention.

As shown in FIG. 6, in conjunction with FIG. 3, application connector 305 monitors messages, communication lists and contact lists, such as an e-mail message 601 created in collaborative application 104. By utilizing natural language processing, application connector 305 identifies the user identifier (UID) of a user by identifying the communication/contact lists, such as the UID (UID of "wyun@xxx.com") listed after the term of "To:." Furthermore, as shown in FIG. 6, application connector 305 also identifies a nickname of the user ("Lisa" 602) using natural language processing. For example, using natural language processing, application connector 305 identifies the term "Dear" which is normally followed by the name of a person ("Lisa" 602). Hence, as illustrated in FIG. 6, application connector 305 monitors an e-mail message being created in collaborative application 104 in which the e-mail message is being sent to Wang Yun (wyun@xxx.com), whom the author of the message calls "Lisa" as discussed in note 603.

As discussed above in connection with steps 401 and 402 of FIG. 4, application connector 305 monitors the e-mail communication event and collects the contact information as discussed in note 604. Such information is provided to contact management module 303 of contact agency 301, which inserts such contact information in a created record, which is inserted into contact list 302, as discussed in note 605.

For example, as shown in FIG. 6 in conjunction with FIG. 5, record 606 was created containing the following information: UID 502 (wyun@xxx.com) of the recipient of the e-mail message, nickname 503 ("Lisa"), source 504 ("Notes®"), time 505 (2019 Jan. 20), frequency 506 (8), score 507 (80) and "related by" 508 (direct: e-mail communication).

After creating contact list 302 containing records of contact information acquired across different collaborative applications 104, a user (e.g., user of computing device 101A) of a collaborative application 104 (e.g., collaborative application 104B) may query contact analyzer 105 for the nickname of a second user whom the user desires to interact via the current collaborative application 104 (e.g., collaborative application 104B). The "current collaborative application," as used herein, refers to the collaborative application 104 that is currently being used by the user. The user may not know the appropriate nickname for the second user that is associated with this collaborative application 104 (e.g., collaborative application 104B). A discussion regarding the user providing such a query and contact analyzer 105 providing the results of such a query is provided below in connection with FIG. 7.

FIG. 7 is a flowchart of a method 700 for identifying an appropriate contact across different collaborative applications in accordance with an embodiment of the present invention.

Referring to FIG. 7, in conjunction with FIGS. 1-6, in step 701, contact analyzer 105 receives a query from a user (user of a computing device 101 utilizing a current collaborative application 104) containing one or more keywords, where the keyword(s) include a nickname or a portion of a nickname of a second user whom the user desires to interact via the current collaborative application. For example, the user of computing device 101A (user of a current collaborative application 104) may provide application connector 305 (e.g., application connector 305A) with the nickname of "Lisa" (nickname of a second user) which is passed to contact query module 304, where such a nickname may have been previously used by the user of computing device 101A to interact with the second user via collaborative application 104C and whom the user desires to interact via the current collaborative application (e.g., collaborative application 104A).

In step 702, contact analyzer 105 searches contact list 302 using the received keyword(s). In particular, contact query module 304 searches contact list 302 for any record containing a nickname that is similar to the provided keyword(s). Such a search may be performed using natural language processing, where contact query module 304 attempts to locate the exact match or a variation thereof of the provided keyword to a nickname in the records of contact list 302.

In step 703, contact analyzer 105 identifies contact record(s) in contact list 302 containing a nickname that exceeds a threshold degree of similarity as the keyword(s).

The "threshold degree of similarity," as used herein, refers to the required degree of similarity between the provided keyword(s) and the nickname in a record in order to conclude that the keyword is similar to the nickname. In one embodiment, the threshold degree of similarity is user-specified. In one embodiment, such a determination is made by contact query module 304 using natural language processing as discussed above.

In step 704, contact analyzer 105 generates a first search result based on the identified contact record(s). For example, as shown in FIG. 6, a user (e.g., user of computing device 101A) of collaborative application 104 (e.g., collaborative application 104A) may input a query containing the nickname of "Lisa" 606 as discussed in note 607, where the query is inputted to contact query module 304 as discussed in note 608. A search is performed in contact list 302 by contact query module 304 for similar nicknames in the stored records as discussed in note 609.

In one embodiment, contact query module 304 calculates the similarity of the keyword(s) to the nicknames contained within the stored contact records and then sorts and ranks them based on such scores. In one embodiment, the score is an indication of the similarity between the keyword and the nickname, where the higher the score, the higher the similarity. In one embodiment, if the similarity score values are the same for some records, then contact query module 304 will sort and rank those records using the score value of the contact records (score 507 of FIG. 5) for a secondary sort and rank.

In one embodiment, contact query module 304 sorts and ranks the results based on the scores, where only the top N records, where N is a positive integer number, are generated and provided as the first search result. An example of one such record being identified is shown in FIG. 8. FIG. 8 illustrates a single search result record 800 generated by contact query module 304 in accordance with an embodiment of the present invention.

Referring to FIG. 8, search result record 800 includes the searching keywords 801 ("Lisa"), the UID 802 in the organization (wyun@xxx.com), the source collaborative application of the record 803 ("Notes®"), how the relationship is built up 804 ("direct: e-mail communication") and latest connect time 805 ("2019-1-20"). Other information may be provided in the search result record and the principles of the present invention are not to be limited in scope to the illustrative embodiment of FIG. 8. Furthermore, it is noted that while FIG. 8 illustrates only a single search result record, contact query module 304 may generate several search result records, where each search result record may contain similar information as shown in search result record 800.

Returning to FIG. 7, in conjunction with FIGS. 1-6 and 8, in step 705, contact analyzer 105 searches and identifies corresponding nicknames associated with the current collaborative application 104 (e.g., collaborative application 104A, such as Slack®) being used by the user of the query using the user identifiers (e.g., wyun@xxx.com) identified in the first search result. In this manner, contact analyzer 105 will be able to identify the appropriate contact for the user to use in order to communicate with the appropriate person using the currently used collaborative application 104.

In step 706, contact analyzer 105 appends the identified nickname (e.g., "ywang") to the first search result.

For example, contact query module 304 may search for corresponding nicknames associated with the current collaborative application 104 (e.g., collaborative application 104A of Slack®) using the UID(s) (e.g., wyun@xxx.com) from the first search results. For instance, the nickname in collaborative application 104 of Slack® that is associated with the UID of wyun@xxx.com is "ywang" as shown in FIGS. 5 and 6. Such a nickname is then appended to the first search result as shown in FIG. 9.

FIG. 9 illustrates appending the nickname of the second user to the search result record of FIG. 8 whom the user desires to interact via the current collaborative application 104 (e.g., collaborative application 104A) in accordance with an embodiment of the present invention.

Referring to FIG. 9, in conjunction with FIG. 8, search result record 800 is appended with the nickname 901 ("ywang") of the second user whom the user desires to interact with in the current collaborative application 104 (e.g., collaborative application 104A) thereby forming appended search result record 900. As a result, the user will now be able to communicate with the second user using the current collaborative application 104 since the user has knowledge of the appropriate nickname for the second user that is associated with the current collaborative application 104.

Returning to FIG. 7, in conjunction with FIGS. 1-6 and 8-9, in step 707, contact analyzer 105 (contact query module 304) searches for contact information on server 102 (e.g., address server 102A) of the current collaborative application 104 (e.g., collaborative application 104A) using the keyword(s) (received in step 701) forming a second search result. Such a second search result is a standard search performed, and as a result, the details regarding such a search will not be discussed in further detail. In one embodiment, a fuzzy lookup is performed on server 102 of the current collaborative application using the keyword(s) (nickname or a portion of a nickname of a second user whom the user desires to interact via the current collaborative application) to search for contact information of the second user.

In step 708, contact analyzer 105 (contact query module 304) merges the appended first search result with the second search result. In one embodiment, such merging involves combining the first search result with the second search result.

In step 709, contact analyzer 105 (contact query module 304) presents the merged search results to the user (user who performed query and who is using the current collaborative application 104). Such merged search results include the nickname of the second user whom the user desires to interact via the current collaborative application 104 (e.g., collaborative application 104A) thereby enabling the user to communicate with the second user using the current collaborative application 104 since the user has knowledge of the appropriate nickname for the second user that is associated with the current collaborative application 104.

For example, as shown in FIG. 6, a search is performed by contact query module 304 for contact information on server 102 (e.g., address server 102A) of the current collaborative application 104 as discussed in note 609.

Such results are combined with the appended first search result forming search result 900 of FIG. 9 as discussed in note 610, which are presented to the user as discussed in note 611.

In the manner discussed above, the embodiments of the present invention improve collaborative systems by enabling the user to locate contact information across different collaborative application.

As discussed above, collaborative systems utilize collaborative applications to enable users to communicate with one another, such as in an organization. A collaborative application is an application used by multiple users within the organization to interact with one another, such as via instant messaging, e-mailing, file sharing, web conferencing, calendar synchronization, etc. Examples of such collaborative applications include Sometime®, Slack® and Box. In an organization, there are times when a user desires to collaborate with other users across different collaborative applications. In such scenarios, the user needs to locate the appropriate contact in order to communicate with the appropriate user via the collaborative application. For example, a user may chat with someone via Sometime® and then desire to share some files with the same individual via Box. Users may attempt to access collaborative applications as well as connect with other users using user identifiers (UIDs). However, UIDs often include complex letter combinations which are not memorable to users. As a result, users may prefer to use the person's name to locate contacts. However, there may be several individuals in the organization with the same name. As a result, users may use a nickname to locate the contact where a nickname is a synonym for the screen name of the user. However, each collaborative application may be associated with a different nickname. That is, a user may have a different nickname for different collaborative applications. For example, one collaborative application (e.g., Slack®) may be associated with the user's initials; whereas, in another collaborative application (e.g., Notes®, Box), it may be associated with the user's first name. Hence, in order for a user to communicate with the same individual using different collaborative applications, the user may need to provide different nicknames. Such contact information though may not be readily available since collaborative applications do not currently share contact information across collaborative applications. Consequently, collaborative systems are deficient in terms of enabling the user to locate contact information across different collaborative applications.

The present invention improves such technology by collecting monitored messages, communication lists and contact lists in each collaborative application. Contact records are generated based on the collected contact information, where such records are inserted into a contact list. Such a contact list may be used to assist the user in identifying the appropriate contact in response to the user providing a nickname or a portion of a nickname. For example, the nickname provided by the user may be used to locate a record in the contact list containing a user identifier, which may be used to identify the nickname of a second user whom the user desires to interact via the current collaborative application. For instance, the user identifier may be associated with the current collaborative application, a record of which may contain the appropriate nickname for the user to use. In this manner, there is an improvement in the technical field involving collaborative systems.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying an appropriate contact across collaborative applications, the method comprising:
   monitoring messages, communication lists and contact lists in each collaborative application in an organization;
   collecting contact information from said monitored messages, communication lists and contact lists;
   generating a contact list comprising contact records based on said collected contact information;
   receiving one or more keywords from a user of a current collaborative application, wherein said one or more keywords comprise a nickname or a portion of said nickname;
   searching said contact list using said received one or more keywords;
   identifying one or more contact records in said contact list containing a nickname that exceeds a threshold degree of similarity as said one or more keywords;
   generating a first search result based on said identified one or more contact records, wherein said first search result contains said searched one or more keywords and a user identifier;
   searching and identifying a corresponding nickname associated with said current collaborative application being used by said user, wherein said corresponding nickname is identified using said user identifier identified in said first search result;
   appending said identified nickname to said first search result forming an appended search result;
   searching for contact information on a server of said current collaborative application using said one or more keywords forming a second search result;
   merging said appended search result with said second search result; and
   presenting said merged search results to said user.

2. The method as recited in claim 1, wherein said first search result contains said searched one or more keywords, said user identifier, a source collaborative application, an indication of how contact information for said contact record was obtained, and a latest connect time.

3. The method as recited in claim 1, wherein said one or more keywords comprise said nickname or a portion of said nickname of a second user, wherein said user previously communicated with said second user using said nickname or said portion of said nickname via a second collaborative application, wherein said user desires to communicate with said second user via said current collaborative application.

4. The method as recited in claim 1, wherein each of said contact records comprises a user identifier, a nickname, a name of a source collaborative application, a latest connection time, a connection frequency with said nickname, a score, and how contact information was used to create said contact record.

5. The method as recited in claim 4, wherein said score is calculated based on said connection frequency, said latest connection time, and how contact information was used to create said contact record.

6. The method as recited in claim 1 further comprising:
   ranking said one or more contact records based on similarity of said one or more keywords to nicknames contained within said one or more contact records.

7. The method as recited in claim 1, wherein said contact information is collected using natural language processing.

8. A computer program product for identifying an appropriate contact across collaborative applications, the computer program product comprising a computer readable storage medium having program code embodied therewith, the program code comprising programming instructions for:
   monitoring messages, communication lists and contact lists in each collaborative application in an organization;
   collecting contact information from said monitored messages, communication lists and contact lists;
   generating a contact list comprising contact records based on said collected contact information;
   receiving one or more keywords from a user of a current collaborative application, wherein said one or more keywords comprise a nickname or a portion of said nickname;
   searching said contact list using said received one or more keywords;
   identifying one or more contact records in said contact list containing a nickname that exceeds a threshold degree of similarity as said one or more keywords;
   generating a first search result based on said identified one or more contact records, wherein said first search result contains said searched one or more keywords and a user identifier;

searching and identifying a corresponding nickname associated with said current collaborative application being used by said user, wherein said corresponding nickname is identified using said user identifier identified in said first search result;

appending said identified nickname to said first search result forming an appended search result;

searching for contact information on a server of said current collaborative application using said one or more keywords forming a second search result;

merging said appended search result with said second search result; and presenting said merged search results to said user.

9. The computer program product as recited in claim 8, wherein said first search result contains said searched one or more keywords, said user identifier, a source collaborative application, an indication of how contact information for said contact record was obtained, and a latest connect time.

10. The computer program product as recited in claim 8, wherein said one or more keywords comprise said nickname or a portion of said nickname of a second user, wherein said user previously communicated with said second user using said nickname or said portion of said nickname via a second collaborative application, wherein said user desires to communicate with said second user via said current collaborative application.

11. The computer program product as recited in claim 8, wherein each of said contact records comprises a user identifier, a nickname, a name of a source collaborative application, a latest connection time, a connection frequency with said nickname, a score, and how contact information was used to create said contact record.

12. The computer program product as recited in claim 11, wherein said score is calculated based on said connection frequency, said latest connection time, and how contact information was used to create said contact record.

13. The computer program product as recited in claim 8, wherein the program code further comprises the programming instructions for:

ranking said one or more contact records based on similarity of said one or more keywords to nicknames contained within said one or more contact records.

14. The computer program product as recited in claim 8, wherein said contact information is collected using natural language processing.

15. A system, comprising:

a memory unit for storing a computer program for identifying an appropriate contact across collaborative applications; and a processor connected to the memory unit, wherein the processor is configured to execute the program instructions of the computer program comprising:

monitoring messages, communication lists and contact lists in each collaborative application in an organization;

collecting contact information from said monitored messages, communication lists and contact lists;

generating a contact list comprising contact records based on said collected contact information;

receiving one or more keywords from a user of a current collaborative application, wherein said one or more keywords comprise a nickname or a portion of said nickname;

searching said contact list using said received one or more keywords;

identifying one or more contact records in said contact list containing a nickname that exceeds a threshold degree of similarity as said one or more keywords;

generating a first search result based on said identified one or more contact records, wherein said first search result contains said searched one or more keywords and a user identifier;

searching and identifying a corresponding nickname associated with said current collaborative application being used by said user, wherein said corresponding nickname is identified using said user identifier identified in said first search result;

appending said identified nickname to said first search result forming an appended search result;

searching for contact information on a server of said current collaborative application using said one or more keywords forming a second search result;

merging said appended search result with said second search result; and presenting said merged search results to said user.

16. The system as recited in claim 15, wherein said first search result contains said searched one or more keywords, said user identifier, a source collaborative application, an indication of how contact information for said contact record was obtained, and a latest connect time.

17. The system as recited in claim 15, wherein said one or more keywords comprise said nickname or a portion of said nickname of a second user, wherein said user previously communicated with said second user using said nickname or said portion of said nickname via a second collaborative application, wherein said user desires to communicate with said second user via said current collaborative application.

18. The system as recited in claim 15, wherein each of said contact records comprises a user identifier, a nickname, a name of a source collaborative application, a latest connection time, a connection frequency with said nickname, a score, and how contact information was used to create said contact record.

19. The system as recited in claim 18, wherein said score is calculated based on said connection frequency, said latest connection time, and how contact information was used to create said contact record.

20. The system as recited in claim 15, wherein the program instructions of the computer program further comprise:

ranking said one or more contact records based on similarity of said one or more keywords to nicknames contained within said one or more contact records.

* * * * *